(12) United States Patent
Ridley

(10) Patent No.: US 8,182,940 B2
(45) Date of Patent: May 22, 2012

(54) ELECTROCHEMICAL CELL STACK

(75) Inventor: Peter John Ridley, Yateley (GB)

(73) Assignee: Renewable Enery Dynamics Technology Ltd., Dublin (IE)

( * ) Notice: Subject to any disclaimer, the term of this patent is extended or adjusted under 35 U.S.C. 154(b) by 681 days.

(21) Appl. No.: 12/226,328

(22) PCT Filed: Apr. 5, 2006

(86) PCT No.: PCT/GB2006/001256
§ 371 (c)(1),
(2), (4) Date: Oct. 14, 2008

(87) PCT Pub. No.: WO2006/111704
PCT Pub. Date: Oct. 26, 2006

(65) Prior Publication Data
US 2010/0086829 A1  Apr. 8, 2010

(30) Foreign Application Priority Data
Apr. 16, 2005  (GB) .................................. 0507756.5

(51) Int. Cl.
*H01M 8/24* (2006.01)
*H01M 8/02* (2006.01)
(52) U.S. Cl. ............ 429/210; 429/14; 429/15; 429/105; 429/513

(58) Field of Classification Search .................. 429/210, 429/14, 15, 105, 513
See application file for complete search history.

(56) References Cited

U.S. PATENT DOCUMENTS

| 4,339,324 A | 7/1982 | Haas et al. |
| 6,555,267 B1 | 4/2003 | Broman et al. |

FOREIGN PATENT DOCUMENTS

| EP | 0 545 548 A | 6/1993 |
| JP | 2002 237323 | 8/2002 |

*Primary Examiner* — Helen O Conley
(74) *Attorney, Agent, or Firm* — Bay State IP, LLC; Adam J. Bruno

(57) ABSTRACT

A redox fuel stack cell comprises a plurality of essentially similar half-cell frames of molded polymer; interleaved between them are semi-permeable membranes and bipolar plate electrodes. The frames are rectangular, with margins around central voids. At the voids, they have rebates in abutting faces for locating the plate electrodes. At their corners, they have apertures for forming ducts throughout the stack for flow of electrolyte to and from the cell cavities provided by the voids. The frames have electrolyte flow passages open in their faces abutting the frames and leading towards each other. The passages stop short of each other and are surrounded by grooves containing sealing O-rings. Diagonally opposite one of the passages end at openings passing through the frames. The other passages have no openings in the frames, but the frames have openings through them in register with the ends of the passages.

19 Claims, 7 Drawing Sheets

ELECTROCHEMICAL CELL STACK

CROSS REFERENCE TO RELATED APPLICATION

This application is for entry into the U.S. National Phase under §371 for International Application No. PCT/GB2006/001256 having an international filing date of Apr. 5, 2006, and from which priority is claimed under all applicable sections of Title 35 of the United States Code including, but not limited to, Sections 120, 363 and 365(c), and which in turn claims priority under 35 USC 119 to Great Britain Patent Application No. 0507756.5 filed on Apr. 16, 2005.

BACKGROUND OF THE INVENTION

The present invention relates to a stack of electrochemical or electrolytic cell, in particular though not exclusively to a regenerative reduction/oxidation (redox) fuel cell stack.

DESCRIPTION OF THE RELATED ART

Electrochemical cells are known which consist of typically between two and fifty alternate positive and negative half cells, although greater numbers are not unknown; since the cells components are stacked together, such plurality of half cells is typically known as an electrochemical stack or an electrolytic cell stack, often shortened simply to "a stack". Significant factors in the design of such a cell stack are the method of construction and thickness of the individual cells. Typical arrangements use what is known as a filter press design comprising within each cell successive layers of a non-conductive gasket material. The layers comprise frames, which provide accommodation for electrode material and also contain within their thickness electrolyte flow distribution passages. Each frame is assembled into one of two types of one half cell—positive and negative; it is noted that in general the design of frames for both positive and negative half cells is essentially similar and their assignment as either is a consequence of the overall construction and use of the stack rather than any inherent characteristic. These frames are typically interleaved alternately with sheets of a suitable electrode material and a suitable membrane separator. This construction produces a succession of half-cell pairs in series with electrodes common to two half cells, whence the electrodes are referred to as bipolar electrodes. It is also possible and desirable in some applications to connect electrically to the intermediate electrodes and, depending on the internal electrolyte distribution arrangement, operate the cells in various other series and/or parallel manners when some or all of the electrodes may be unipolar rather than bipolar.

Since the frames must provide a number of different features, including hydraulic sealing, mechanical strength, accommodation of the electrode and flow distribution passages, these passages being required to provide both isolation against internal shunt currents and conversely minimal flow resistance and uniform flow distribution, a design compromise between features is usually required. In particular, it is known to be desirable to achieve high linear flow velocity of electrolyte within the cell, which implies small cell spacing but since the frame thickness defines the spacing this in turn has the undesired effect of reducing the depth available for the distribution passages which are typically indented into one or other surface of the frames. Furthermore, it is known that for efficient and reliable cell performance, closure of the distribution channels within such frames must be achieved such as to prevent undesirable and potentially damaging paths for both hydraulic and electrical current leakage.

SUMMARY OF THE INVENTION

The object of the present invention is to provide an improved electochemical cell stack.

According to the invention there is provided an electrochemical stack cell comprising a plurality of cells arranged side-by-side in a stack, each cell having:
  a membrane,
  a first half cell cavity on one side of the membrane and a second half cell cavity on the other side of the membrane,
  a respective electrode plate at the side of each half cell opposite from the membrane, each electrode plate providing contact between adjacent cells at least for intermediate ones of the cells,
  a pair of frames, one for one half cell and the other for the other, the frames:
    captivating the membrane between themselves,
    locating the electrode plates and
    having:
      continuous margins around central voids providing the half cell cavities,
      apertures in the continuous margins providing ducts for flow of electrolyte through the stack for distribution to the cells,
      electrolyte distribution rebates at opposite inside edges of the margins and
      passages in the continuous margins for electrolyte flow from one of the duct apertures, into and out of the half cell at the distribution rebates and to another of the duct apertures,
wherein:
  each plate electrode is captivated between a frame from one cell and a frame from an adjacent cell with at least two portions of the margins of these frames extending outside respective edges of the plate electrode, the adjacent cell frames having faces which abut at the portions;
  the flow passages are formed in the faces of the margins and are closed by abutting opposite frame faces; and
  through-frame openings are provided in the frames for extending the passages from the abutting faces of the frames to the other, membrane side of the frames into distribution rebates.

Although other configurations are possible particularly curved or polygonal having rectilinear opposite margins with the electrolyte duct apertures arranged at the corners, normally the frames will be rectangular, i.e. having four straight margins, with the electrolyte duct apertures arranged at the corners. The flow passages can be distributed into all four margins, however, they are preferably provided in two opposite margins only. It is possible to provide all the passages in the face of one of each pair of abutting face frames, i.e. with two passages in each marginal portion having passages with one through frame opening in the portion at the end of one of the passages and another said opening in the other frame opposite the end of the other passage. Alternatively, one passage only can be provided in each marginal portion having a said flow passage. Conveniently each flow passage then has an opening through the frame; or all openings can be provided in the opposite marginal portion. The passages can be provided such that the frames have symmetry about a central axis transverse the plane of their abutting faces; or the passages can be arranged to extend from two duct apertures at neighbouring corners of the frame, with the passages extending in the marginal portions extending away from the margin interconnecting the neighbouring corners.

Conveniently, the electrodes are captivated at rebates in the abutting faces of the frames extending around the entire continuity of the margins around the central void.

Whilst it is envisaged that frames could be held together with sufficient compression to seal the cavities, the ducts and the passage ways, particularly where the frames are of elastomeric material. However it is preferred to provide seals around the ducts and the passages radiating from them and around the electrodes. The seals can be of gasket material, but are preferably O-rings set in grooves in frames.

In the preferred embodiment, passage extensions are provided in the opposite faces of the frames from the abutting faces, the extensions extending from the through-frame openings to the respective electrolyte distribution rebates. Preferably, the electrolyte distribution rebates are wider than the electrode captivation rebates.

BRIEF DESCRIPTION OF THE DRAWINGS

To help understanding of the invention, a specific embodiment thereof will now be described by way of example and with reference to the accompanying drawings, in which.

DETAILED DESCRIPTION OF THE PREFERRED EMBODIMENT

Figure 1:
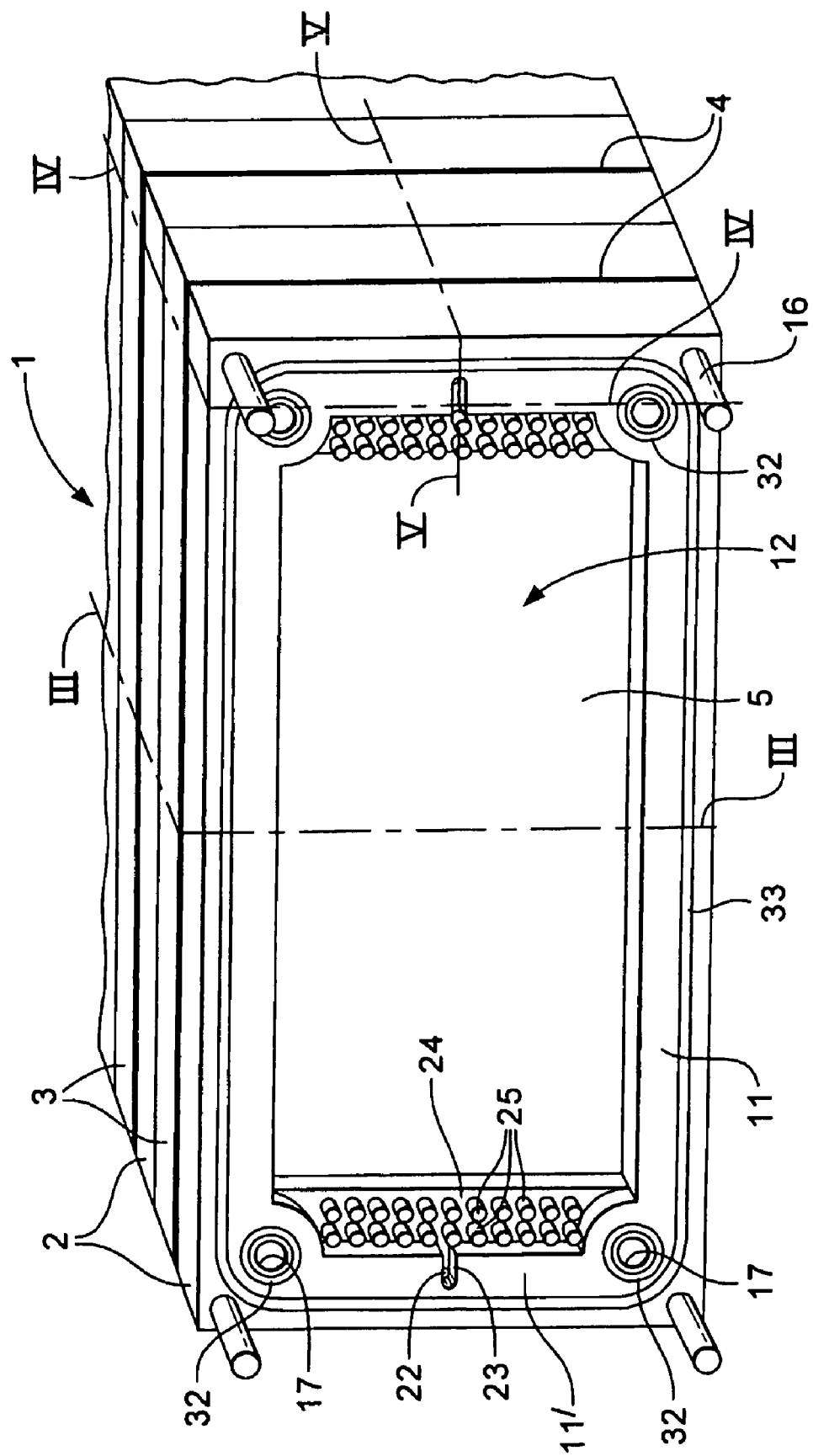
FIG. 1 is a perspective view of part of a cell stack of the invention, a full stack in practice having more cells than shown.

Referring to the drawings, a redox fuel cell stack 1 comprises a plurality of half cell frames 2,3 which are essentially the same, although differing slightly. They are of moulded polymer. Interleaved between them are semi-permeable membranes 4 and graphite plate electrodes 5 (which are of polymer heavily filled with graphite powder or flakes). In use the electrodes act as bipolar electrodes for respectively different reagents and reactions on either side. The membranes equally separate the reagents and allow passage of selected ions and electrons as the reaction progresses. The present invention is concerned with the physical arrangement of the features of the cell stack, although it should be noted that a complete electro-chemical cell is present between each pair of electrodes and includes a membrane and half cell spaces provided by the voids about to be described.

Figure 2:
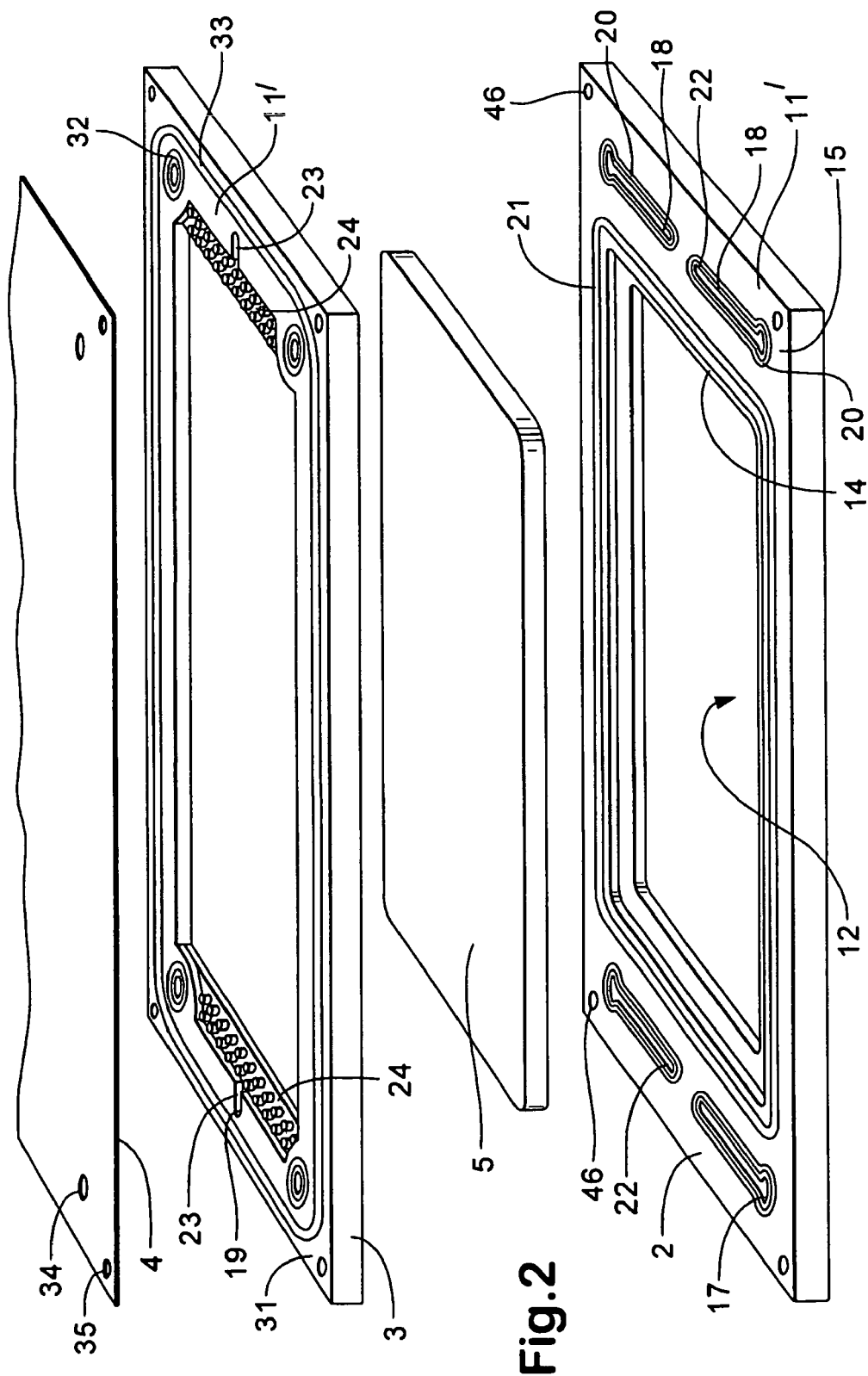
FIG. 2 is an exploded view of two frames, an electrode and a membrane of the stack of FIG. 1.
Figure 4:
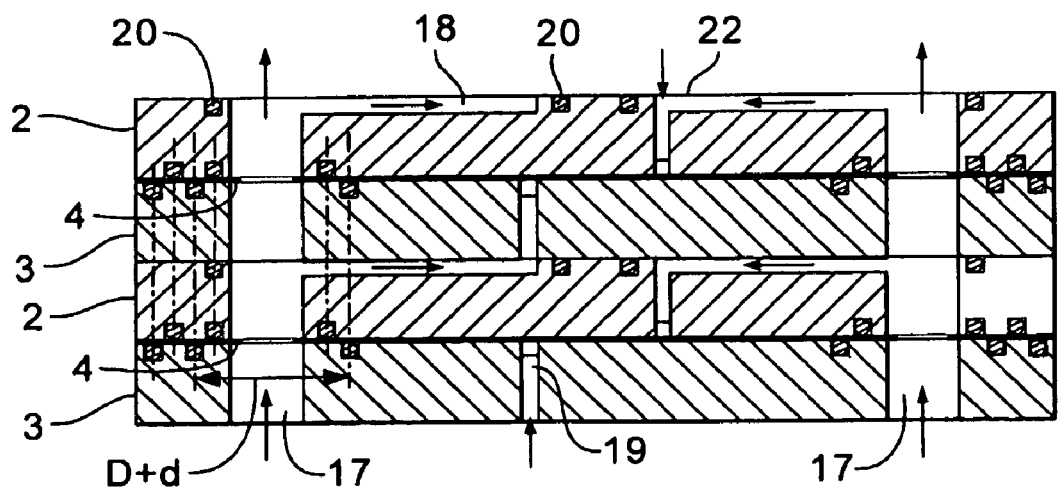
FIG. 4 is another cross-sectional side view of fewer frames on the plane IV-IV shown in FIG. 1.
Figure 5:
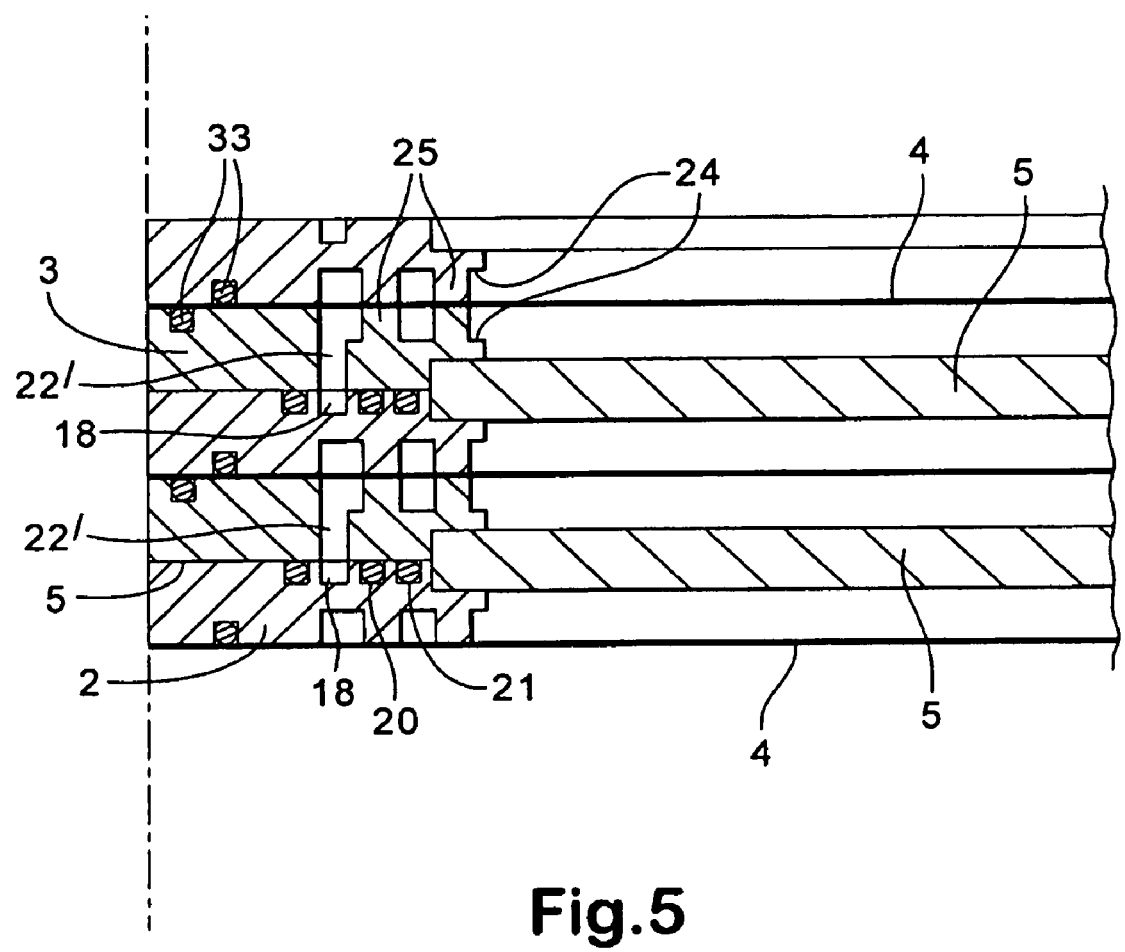
FIG. 5 is a scrap cross-sectional side view on the plane V-V shown in FIG. 1.

The frames 2,3 are both rectangular, with margins 11 around central voids 12. At the voids, they have rebates 14 in abutting faces 15 for locating the plate electrodes. Closest to their corners, they have small holes 46 for location rods 16 and set in from these, apertures 17 are provided for forming ducts throughout the stack for flow of electrolyte to and from the cell cavities provided by the voids 12. With reference to FIGS. 2, 4 & 5, the frames 2 have electrolyte flow passages 18 open in their faces 15 abutting the frames 3 and leading from the duct apertures 17 towards each other in end parts 11' of the margins of the frames. The passages stop short of each other and are surrounded by grooves containing sealing O-rings 20. These latter seal with the opposite face of the abutting frame. Also in the faces 15 are grooves for O-rings 21 sealing the frames around the electrode plates 5. The O-rings 20,21 seal the frames against leakage of electrolyte out from between them. Diagonally opposite ones of the passages 18 end at openings 22 passing through the frames 2. The other passages have no openings in the frames 2, but the frames 3 have openings 19 through them in register with the ends of the passages.

On the other side of the frames 2 and 3, the openings 22,19 open into short passages 23 directed towards the central voids and debouching into electrolyte distribution rebates 24, which extend the full width of the central voids at the margin end parts 11'. These rebates have dimples 25 for locating a membrane 4 between them, insofar as a rebate in one frame 2 is adjacent another in frame 3 and so on. Thus electrolyte can flow from one duct aperture 17 in one corner, via the passage 18 from the aperture, either through the frame 2 via the opening 22 or the frame 3 via the opening 19, through short passage 23 and the respective distribution rebate 24 and into the central void to whichever side of the plate electrode it was directed by the opening 19,22. From the opposite end of the central void, the electrolyte is lead back into the diagonally opposite duct aperture 17.

The half cells which the central voids define are closed by the membranes 4, captivated between the frames 2,3 at their faces opposite from those abutting at the electrode plates. These faces 31 have O-rings 32 in grooves around the apertures 17 and O-rings 33 in grooves around the entirety of the central void and the apertures 17. These seal with the membrane. In order to avoid O-rings pressing against O-rings via the membrane, ones O-rings in the frames 2 are set at a smaller diametral dimension D than those D+d in the frames 3, whereby the O-rings are offset from each other, as can be seen in FIG. 4. Similarly, the O-rings 33 on opposite sides of the membranes are staggered. It should be noted that the membranes are apertured at 34 & 35 for flow of electrolyte in the ducts 17 through them and the location rods 16.

Figure 3:
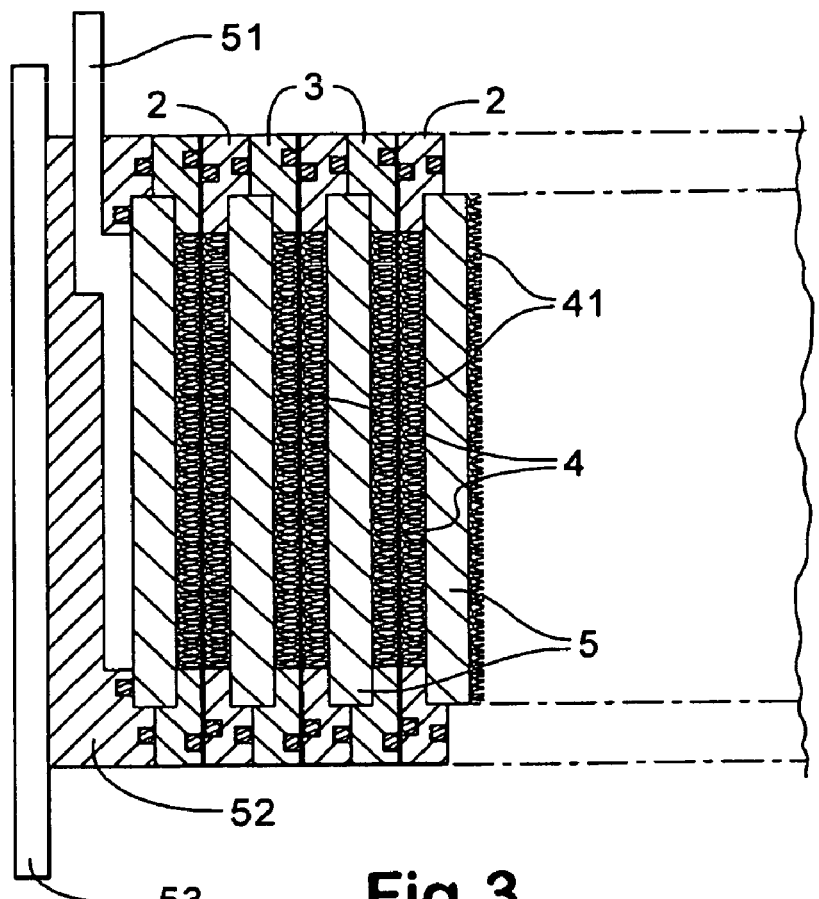
FIG. 3 is a cross-sectional side view of the stack of FIG. 1 on the plane III-III shown in FIG. 1.

As shown in FIG. 3, the half cells can include three dimensional electrodes in the form of graphite felt pads 41. These fill the central voids, from the electrode plates to the membranes. However, the felt is open in the sense of having appreciable spaces around the individual fibres. Thus the felt provides little resistance to flow of the electrolyte through the cell.

At the end of the stack, a copper collector plate 51 is provided across the end one of the plate electrodes for collection of current from it. The collector plate is set in an insulating carrier 52 and the whole stack is held in compression by an end plate 53. This is clamped in position by non-shown studs acting between it and another compression plate at the other end of the stack.

Figure 6:
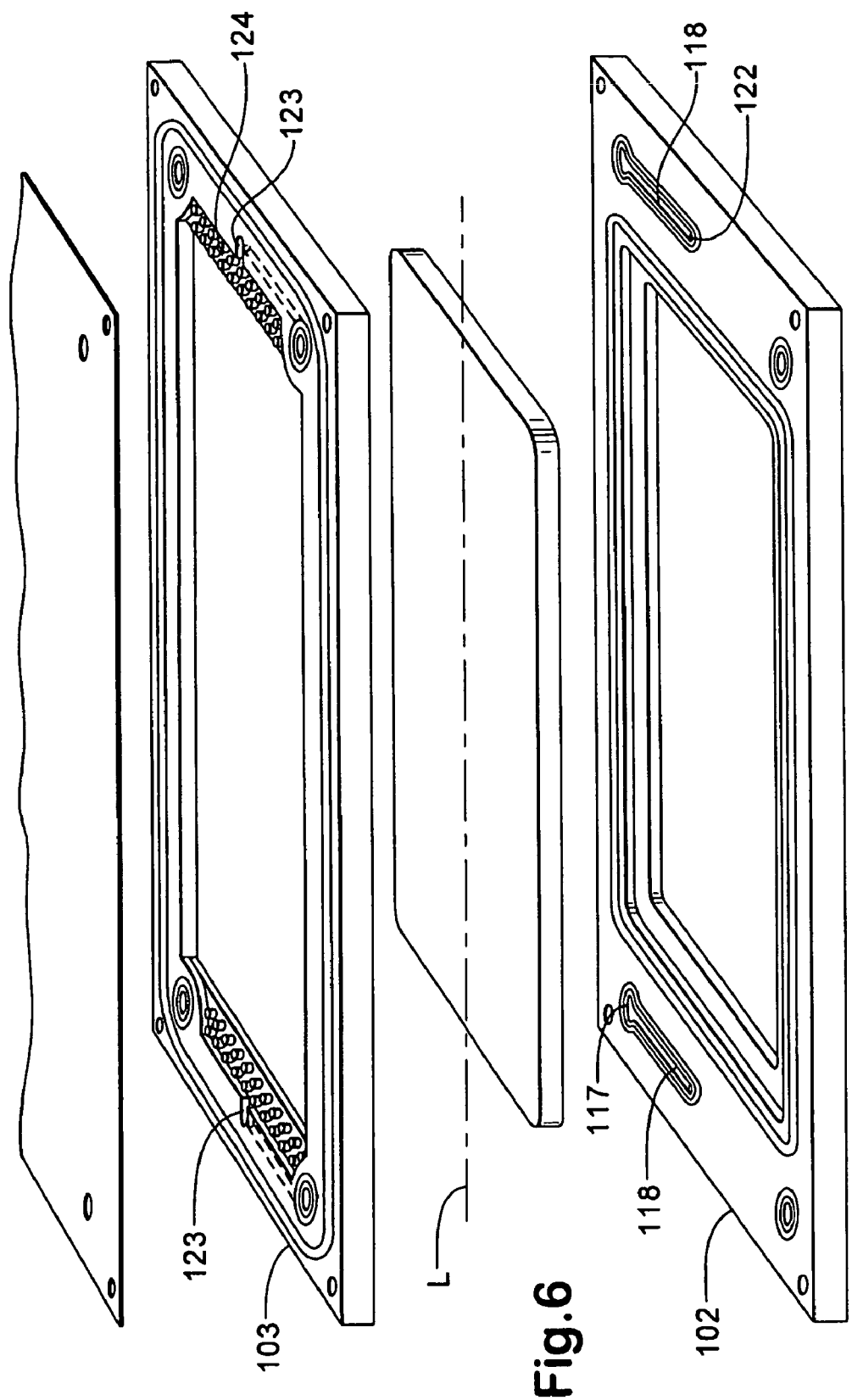
FIG. 6 is a view similar to FIG. 2 of alternative frames, having an alternative passage layout.
Figure 7:
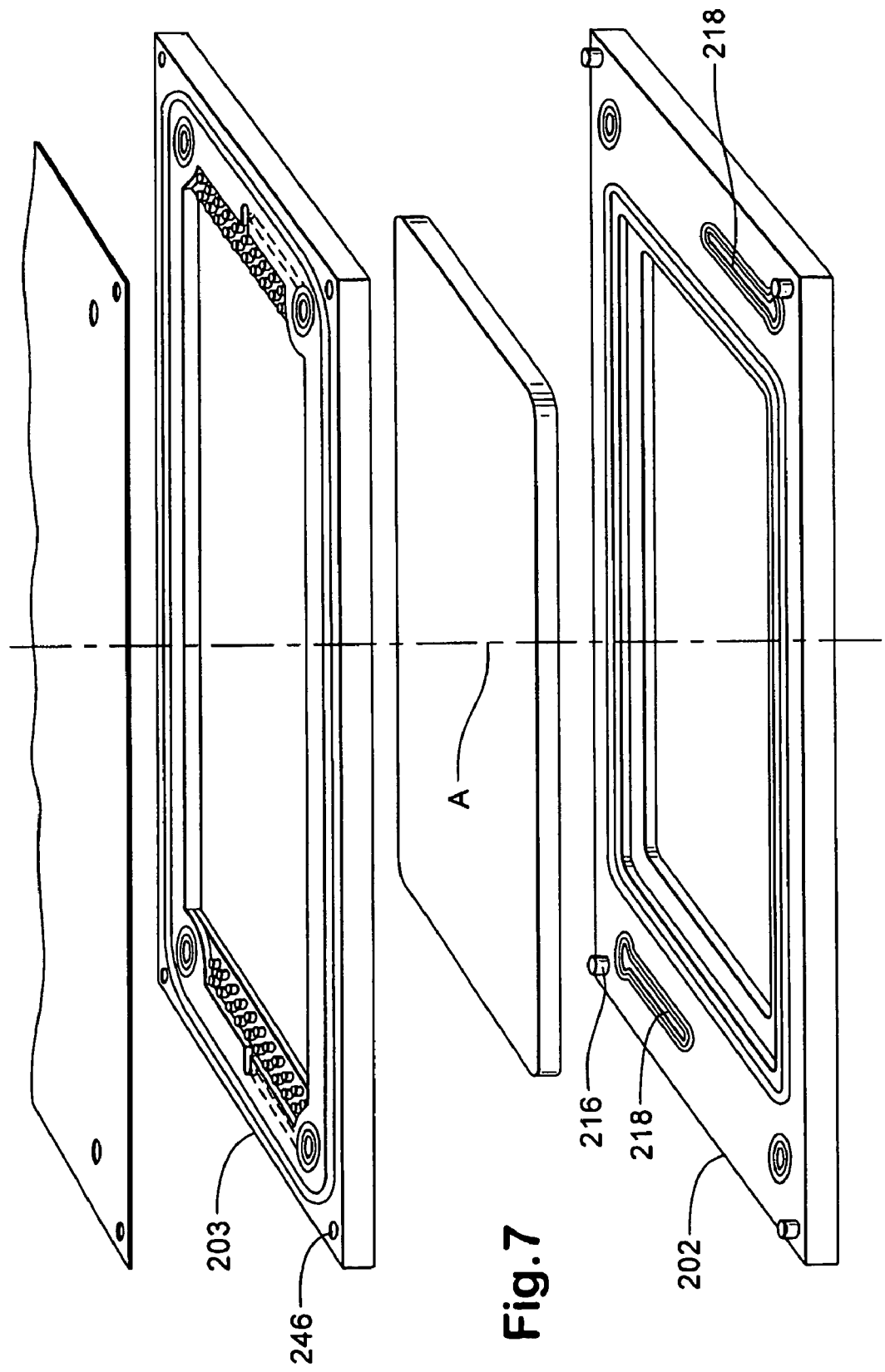
FIG. 7 is another view similar to FIG. 2 showing another alternative passage layout.

FIGS. 6 & 7 show alternative passage layouts. In FIG. 6, the frame 102 has a passages 118 from the duct apertures 117 at one long side only of the frame. At the end of each passage there is a through opening 122 to further passages and distribution rebates on the other side. These 123,124 are shown in frame 103, which has the same layout of passages, as can be envisaged as rotation of the frame 103 about the longitudinal axis L. It should be noted that short passages 123 are both on the same side of the longitudinal axis L. In FIG. 7, the passages 218 are arranged symmetrically about the central transverse axis A, as well as the layout being symmetrical about the axis L. Otherwise, the arrangement is essentially similar. Whilst it is desirable for production purposes that the two frames 102 & 103, 202 & 203 respectively should be identical, the provision of the O-rings at the membrane with differing diametral dimensions causes the frames to be different and mitigates against them being otherwise identical. The arrangement shown in FIG. 7 has moulded recesses 246 in both faces of the frames 203 in place of the holes 46 and lugs 216 moulded on both faces of the frames 202. This arrangement ensures that the frames are assembled with the O-rings within each other as intended, even although the passage layout is identical.

With either of these alternatives, or with the embodiment of FIGS. 1 to 5, the frames 2,3; 102,103; 202,203 can be assembled together in pairs with their electrode plates and O-rings, as sub-assemblies. The sub-assemblies are then stacked together with a membrane sandwiched between each sub-assembly. This is a more convenient manufacturing process than assembling the stack from a successive selection of four components.

It should be noted that the above described stacks have the following additional advantages:

The flow passages are defined in one rigid frame face, closed by another. Thus the passages are dimensionally stable, electrically isolated from the plate electrodes and not bounded by the membrane. This arrangement gives more predictable properties to the finished stack for instance in terms of the loss due to ohmic connection of one electrode to the next by the electrolyte columns in the passages connecting each electrode to its neighbour via the electrolyte flow passages;

The O-rings provide a high degree of sealing integrity;

The cell thickness, in terms of the separation from the membranes to the electrode plates is independent of the thickness of the frames. For instance very thin cells can be constructed, which would provide difficulties in terms of flow passage depth, with the flow passages being accommodated in that part of the frames accommodating the thickness of the electrode plates.

The frames can be moulded in simple insert-less moulds and the only additional parts required are the electrodes, membranes and seals. (In our prior cell stack, numerous location washers were required.)

The cell stack is equally suitable for cells used for generating electricity by electrochemical reaction as for cells in which electrochemical reaction is brought about by application of electricity. For this reason, no details of the chemicals nor the reactions are given. However, the chemicals are likely to be corrosive, and as such the materials of the cell need to be as resistant to chemical reaction as reasonably possible. For instance, the electrode plate is preferably of graphite filled polypropylene, with the same polymer being used for the frames. The O-rings can be of fluoroelastomer, typically Viton® material from DuPont. The membranes can be of conventional electrochemical membrane material.

Figure 8:
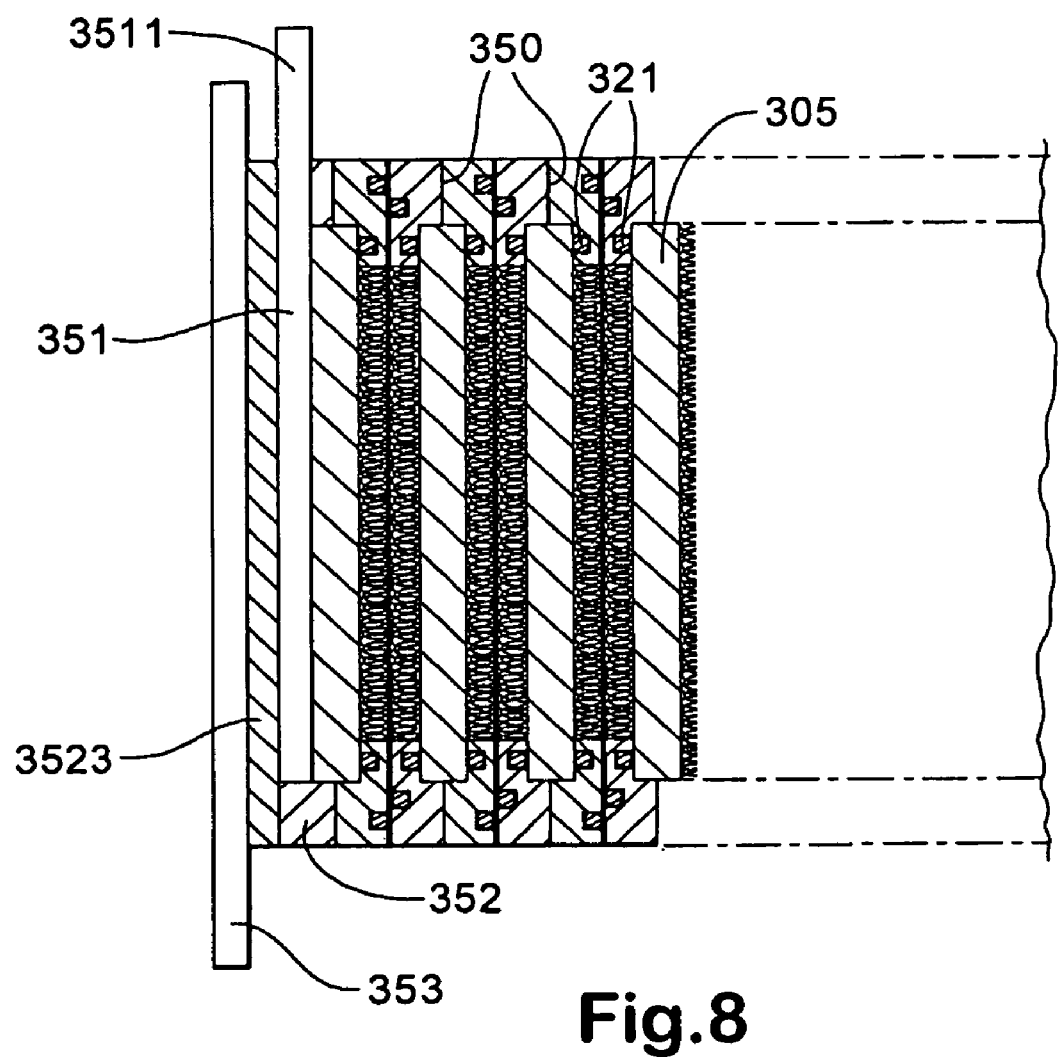
FIG. 8 is a cross-sectional side view of another alternative cell stack.

The invention is not intended to be restricted to the details of the above described embodiment. For instance, where the chemistry of the reaction in the cell is suited to very thin cells without three dimensional electrodes, the felt electrode can be omitted. Further; it is envisaged that at least at the abutting faces 15, the frames may be bonded together to captivate and seal the electrodes and seal the passages and duct apertures. FIG. 8 shows adhesive 350 for this. In the variant shown in this Figure, the O-rings 21 sealing the frames to each other peripherally of the electrode plates 5 have been replaced by O-rings 321 sealing the frames to the electrode plates 305, in inwards of the adhesive 350. This variant shows an end, copper current collector plate 351 located in a special end frame 352 have a rectangular cut-out 3521 for the collector plate 351 and a groove 3522 for a contact tongue 3511 of the collector plate. A back-up plate 3523 insulates the collector plate from a clamp plate 353.

The invention claimed is:

1. An electrochemical stack cell comprising a plurality of cells arranged side-by-side in a stack, each cell having:
   a membrane;
   a first half cell cavity on one side of said membrane and a second half cell cavity on the other side of said membrane;
   a respective electrode plate at the side of each half cell opposite from said membrane, each electrode plate providing contact between adjacent cells at least for intermediate ones of said cells;
   a pair of frames, one for one half cell and the other for the other, said cell frames:
      captivating said membrane between themselves;
      locating said electrode plates; and
      having:
         continuous margins around central voids providing said half cell cavities;
         duct apertures in said continuous margins providing ducts for flow of electrolyte through said stack for distribution to said cells;
         electrolyte distribution rebates at opposite inside edges of said margins; and
         passages in said continuous margins for electrolyte flow from one of said duct apertures, into and out of said half cell at said electrolyte distribution rebates and to another of said duct apertures;
   wherein:
      each plate electrode is captivated between said cell frame from one cell and said cell frame from an adjacent cell with at least two portions of said margins of said cell frames extending outside respective edges of said plate electrode, said adjacent cell frames having faces which abut at said portions;
      said flow passages are formed in said faces of said margins and are closed by abutting opposite frame faces; and
      through-frame openings are provided in said frames for extending said passages from said abutting faces of said frames to the other, membrane side of said cell frames into said electrolyte distribution rebates.

2. An electrochemical stack cell according to claim 1, having rectilinear opposite margins with said electrolyte duct apertures arranged at corners of said cell frames.

3. An electrochemical stack cell according to claim 2, wherein said flow passages are provided in two opposite ones of said margins.

4. An electrochemical stack cell according to claim 3, wherein all said passages in the face of one of each pair of abutting face frames, i.e. with two said passages in each marginal portion having passages with one through-frame opening in the portion at the end of one of said passages and another said opening in the other said cell frame opposite the end of the other said passage.

5. An electrochemical stack cell according to claim 3, wherein one passage only is provided in each marginal portion having said flow passage.

6. An electrochemical stack cell according to claim 5, wherein each said passage has an opening through its frame.

7. An electrochemical stack cell according to claim 5, wherein all through-frame openings are provided in said marginal portion opposite from the end of the respective said passages.

8. An electrochemical stack cell according to claim 3, wherein said flow passages are provided such that said cell frames have symmetry about a central axis transverse to the plane of their abutting faces.

9. An electrochemical stack cell according to claim 3, wherein said passages are arranged to extend from two said duct apertures at neighboring corners of said cell frame, with said passages extending in said marginal portions extending away from said margin interconnecting the neighboring corners.

10. An electrochemical stack cell according to claim 1, including electrode captivation rebates in said abutting faces of said cell frames extending around the entire continuity of said margins around said central void, said electrodes are captivated at said electrode captivation rebates.

11. An electrochemical stack cell according to claim 10, wherein said electrolyte distribution rebates are wider than said electrolyte captivation rebates.

12. An electrochemical stack cell according to claim 11, including flow spreading elements in said electrolyte distribution rebates.

13. An electrochemical stack cell according to claim 11, wherein said cell frames are held together with sufficient compression to seal said cavities, said ducts and said passage ways, said cell frames being of elastomeric material.

14. An electrochemical stack cell according to claim 1, wherein said seals are provided around said ducts and said passages radiating from them, around said electrodes and around said half cell cavities between said cell frame and said membranes.

15. An electrochemical stack cell according to claim 14, including seal grooves in said cell frames, said seals being O-rings set in said seal grooves, said seal grooves and said O-rings on one side of said membrane being of seat at a smaller diametral dimension than those on the other side, whereby said O-rings are offset from each other.

16. An electrochemical stack cell according to claim 14, wherein O-ring seals are provided on opposite sides of said electrode plates, sealing them to said cell frames captivating them.

17. An electrochemical stack cell according to claim 1, wherein at least some adjacent half cell frames are bonded together.

18. An electrochemical stack cell according to claim 1, including passage extensions in the opposite faces of said cell frames from said abutting faces, said extensions extending from said through-frame openings to said respective electrolyte distribution rebates.

19. An electrochemical stack cell according to claim 1, including three dimensional electrodes extending from said plate electrodes into said respective half cells.

* * * * *